United States Patent
Honda et al.

(10) Patent No.: US 10,249,443 B2
(45) Date of Patent: Apr. 2, 2019

(54) HERMETIC TERMINAL, ALUMINUM ELECTROLYTIC CAPACITOR, AND METHOD FOR MANUFACTURING ALUMINUM ELECTROLYTIC CAPACITOR

(71) Applicant: SCHOTT Japan Corporation, Koka-shi, Shiga (JP)

(72) Inventors: Hiroki Honda, Koka (JP); Susumu Nishiwaki, Koka (JP); Masahiro Taketomi, Koka (JP); Akira Okuno, Koka (JP); Tarou Hirai, Koka (JP); Ko Mamiya, Koka (JP)

(73) Assignee: SCHOTT Japan Corporation, Koka-shi, Shiga (JP)

( * ) Notice: Subject to any disclaimer, the term of this patent is extended or adjusted under 35 U.S.C. 154(b) by 0 days.

(21) Appl. No.: 15/578,444

(22) PCT Filed: Jun. 2, 2016

(86) PCT No.: PCT/JP2016/066438
§ 371 (c)(1),
(2) Date: Nov. 30, 2017

(87) PCT Pub. No.: WO2016/195027
PCT Pub. Date: Dec. 8, 2016

(65) Prior Publication Data
US 2018/0151300 A1   May 31, 2018

(30) Foreign Application Priority Data
Jun. 3, 2015   (JP) .................. 2015-112734

(51) Int. Cl.
*H01G 9/008*   (2006.01)
*H01G 9/10*   (2006.01)
(Continued)

(52) U.S. Cl.
CPC ............. *H01G 9/045* (2013.01); *H01G 9/008* (2013.01); *H01G 9/035* (2013.01); *H01G 9/06* (2013.01); *H01G 9/10* (2013.01); *H01G 9/145* (2013.01)

(58) Field of Classification Search
CPC .................................. H01G 9/08; H01G 9/10
See application file for complete search history.

(56) References Cited

U.S. PATENT DOCUMENTS 3,600,017 A * 8/1971 Scherer ................... C03C 29/00
403/29
4,476,517 A * 10/1984 Fresia .................... H01G 9/022
361/327
(Continued)

FOREIGN PATENT DOCUMENTS

CN   104465109 A   3/2015
EP   1 014 400   6/2000
(Continued)

OTHER PUBLICATIONS

PCT International Search Report of the International Searching Authority for International Application PCT/JP2016/066438, dated Aug. 9, 2016, 2 pages, Japanese Patent Office, Tokyo, Japan.
(Continued)

*Primary Examiner* — Eric W Thomas
(74) *Attorney, Agent, or Firm* — W. F. Fasse

(57) ABSTRACT

According to a hermetic terminal based on the present invention, a hermetic terminal (10) to be hermetically fixed to an aluminum electrolytic capacitor (20) includes: a base (11) which has a through hole, is to be attached to a case (16) of the aluminum electrolytic capacitor (20), and is made of a composite material having electrical conductivity; at least one lead (12) which is inserted into the through hole of the base (11), and is made of a composite material having electrical conductivity; and an insulating glass (13) which
(Continued)

hermetically seals a gap between the base (11) and the lead (12). Surfaces of portions of the base (11) and the lead (12) which come into contact with an electrolytic solution within the case (16) are composed of a metal material having corrosion resistance to the electrolytic solution.

14 Claims, 10 Drawing Sheets

(51) Int. Cl.
  *H01G 9/045* (2006.01)
  *H01G 9/035* (2006.01)
  *H01G 9/06* (2006.01)
  *H01G 9/145* (2006.01)

(56) References Cited

U.S. PATENT DOCUMENTS

| | | |
|---|---|---|
| 6,219,224 B1 | 4/2001 | Honda |
| 2003/0027038 A1 | 2/2003 | Tsukamoto et al. |
| 2013/0029215 A1 | 1/2013 | Signorelli et al. |
| 2015/0077901 A1 | 3/2015 | Petrzilek |

FOREIGN PATENT DOCUMENTS

| | | |
|---|---|---|
| JP | 01-315126 A | 12/1989 |
| JP | 02-158066 A | 6/1990 |
| JP | 08-162188 A | 6/1996 |
| JP | 2000-182907 A | 6/2000 |
| JP | 2004-342649 A | 12/2004 |
| JP | 2010-114132 A | 5/2010 |
| JP | 2012-084626 A | 4/2012 |

OTHER PUBLICATIONS

PCT International Preliminary Report on Patentability including English Translation of PCT Written Opinion of the International Searching Authority for International Application PCT/JP2016/066438, dated Dec. 5, 2017, 6 pages, International Bureau of WIPO, Geneva, Switzerland.

"General Description of Aluminum Electrolytic Capacitors", Nichicon Corporation, 2014, Technical Note CAT.1101G, 1 page, with English translation, Technical Notes CAT.8101E-1, 1 page.

Extended European Search Report and Examination Report for European Patent Application No. 16803461.9, dated Dec. 19, 2018, 9 pages, European Patent Office, Munich, Germany.

Chinese Office Action in Chinese Patent Application No. 201680031455.7, dated Oct. 29, 2018, 7 pages, with English translation, 8 pages.

\* cited by examiner

HERMETIC TERMINAL, ALUMINUM ELECTROLYTIC CAPACITOR, AND METHOD FOR MANUFACTURING ALUMINUM ELECTROLYTIC CAPACITOR

TECHNICAL FIELD

The present invention relates to a hermetic terminal used for an aluminum electrolytic capacitor, an aluminum electrolytic capacitor using the hermetic terminal, and a method for manufacturing an aluminum electrolytic capacitor.

BACKGROUND ART

A common hermetic terminal used for a crystal oscillator or the like includes a base made of a Kovar material (an alloy containing 54% of iron, 28% of nickel, and 18% of cobalt), a lead also made of a Kovar material, an insulating glass which seals the base and the lead, and an iron cap into which the base is press-fitted and fixed. A pair of through holes are formed in the base, and the lead penetrates each through hole. A gap between the lead and the base is hermetically sealed with the insulating glass. The lead and the base are electrically insulated by the insulating glass.

In such a conventional hermetic terminal, in order to ensure solderability of an outer lead when mounting a printed circuit board, solder alloy plating or electrolytic plating such as tin plating, nickel plating, gold plating, or the like is performed on the entire surface of the hermetic terminal.

As a method of electrolytic plating, a barrel plating method is adopted. In the barrel plating method, a large number of hermetic terminals are housed in a barrel having liquid permeability, and the barrel is immersed in a plating bath. The immersed barrel is rotated to plate the large number of hermetic terminals at once.

Further, as a method for selectively performing solder alloy plating, nickel plating, gold plating, silver plating, rhodium plating, or the like on a base and a lead, a method described in PTD 1 is adopted, for example.

Here, passive components constituting an electronic circuit include an aluminum electrolytic capacitor. The aluminum electrolytic capacitor includes a high-purity anode aluminum foil, a cathode aluminum foil, an electrolytic solution, and capacitor paper. The high-purity anode aluminum foil has an oxide film formed on a surface which serves as a dielectric.

The aluminum electrolytic capacitor has a capacitor element formed by causing the anode foil and the cathode foil to face each other, sandwiching the capacitor paper therebetween, and cylindrically winding them. However, in this state, the capacitor element has a small electrostatic capacitance. By impregnating the capacitor paper with the electrolytic solution to serve as electrolytic paper, an anode foil surface and a cathode foil surface are electrically connected, and thus a capacitor element having a large electrostatic capacitance which uses an aluminum oxide film on the anode foil surface as a dielectric is obtained (see NPD 1).

This electrolytic solution acts as a real cathode, and the aluminum electrolytic capacitor ends its life when the electrolytic solution dries up. Since the aluminum electrolytic capacitor generally belongs to a group of components having the shortest life among the components constituting an electronic circuit, there has recently been a demand for an aluminum electrolytic capacitor having a longer life.

In recent electronic circuits, an electronic component is often mounted in a narrow gap. Also in aluminum electrolytic capacitors, in addition to conventional aluminum electrolytic capacitors of the cylindrical case type, aluminum electrolytic capacitors having a non-cylindrical shape, such as those having the shape of a flat plate with a low height, have increased. In these aluminum electrolytic capacitors having a non-cylindrical shape, a bottom portion of a case has the shape of a rectangle or an ellipse. In a conventional aluminum electrolytic capacitor of the cylindrical case type, a disk-shaped rubber packing is inserted into a cylindrical case, and sealing is performed by uniformly swaging an end portion of the case. When the bottom portion of the case has the shape of a rectangle or an ellipse, it is difficult to perform sealing by uniform swaging.

In order to achieve an aluminum electrolytic capacitor having a longer life, it is favorable if the aforementioned hermetic terminal can be used to seal a case which houses a capacitor element. By using the hermetic terminal, hermeticity is improved, and drying-up of an electrolytic solution can be prevented. In addition, since press fitting and resistance welding can be used when sealing the hermetic terminal to the case, hermeticity can be ensured without being influenced by the shape of the case.

However, in a conventional hermetic terminal, a base material made of iron or an iron-based alloy is subjected to electroplating with a soft metal, such as solder plating, tin plating, nickel plating, gold plating, or the like. When these conventional plating films are brought into contact with an electrolytic solution for a long period of time, the plating metal or the metal composing the base material is gradually dissolved in the electrolytic solution and contaminates the electrolytic solution. Since contamination of the electrolytic solution has an adverse effect on the properties of a capacitor, it is not possible to use the conventional hermetic terminal for an aluminum electrolytic capacitor.

Although it is also conceivable to use aluminum to compose the base and the lead of the hermetic terminal, it has not been possible to realize this conception, for reasons that there is no glass material whose thermal expansion coefficient matches that of aluminum, that the step of sealing with glass in the hermetic terminal requires heating to about 1,000° C. and results in melting of an aluminum material, and the like.

CITATION LIST

Patent Document

PTD 1: Japanese Patent Laying-Open No. 2004-342649

Non Patent Document

NPD 1: "Aluminum Electrolytic Capacitor Technical Note CAT.1101G", NICHICON CORPORATION, 2014, p. 1

SUMMARY OF INVENTION

Technical Problem

An object of the present invention has been set in order to solve the aforementioned problem, and is to provide a hermetic terminal, an aluminum electrolytic capacitor, and a method for manufacturing an aluminum electrolytic capacitor in which a metal composing a lead and a base does not contaminate an electrolytic solution for the aluminum electrolytic capacitor even when the metal is in contact the electrolytic solution for a long period of time.

Solution to Problem

According to a hermetic terminal based on the present invention, a hermetic terminal to be hermetically fixed to an aluminum electrolytic capacitor includes: a base which has a through hole, is to be attached to a case of the aluminum electrolytic capacitor, and is made of a composite material having electrical conductivity; at least one lead which is inserted into the through hole of the base, and is made of a composite material having electrical conductivity; and an insulating glass which hermetically seals a gap between the base and the lead. Surfaces of portions of the base and the lead which come into contact with an electrolytic solution within the case are composed of a metal material having corrosion resistance to the electrolytic solution.

In the hermetic terminal, the base may have a base material made of an iron-based metal material, and a surface material made of aluminum which covers at least one surface of the base material.

In the hermetic terminal, the lead may have an outer lead made of an iron-based metal material, and an inner lead made of aluminum which is butt-joined to one end of the outer lead.

In the hermetic terminal, the insulating glass may be a low-melting-point glass having a melting point lower than that of aluminum.

According to an aluminum electrolytic capacitor based on the present invention, the aluminum electrolytic capacitor includes: the hermetic terminal described above; an anode aluminum foil having an oxide film on a surface; electrolytic paper impregnated with an electrolytic solution; a cathode aluminum foil; and a case made of aluminum in which the anode aluminum foil, the electrolytic paper, and the cathode aluminum foil are housed therein and to which the hermetic terminal is hermetically sealed. At least one of the anode aluminum foil and the cathode aluminum foil is electrically connected to the inner lead.

In the aluminum electrolytic capacitor, one of the anode aluminum foil and the cathode aluminum foil may be electrically connected to the inner lead, and the other of the anode aluminum foil and the cathode aluminum foil may be electrically connected to the base.

In the aluminum electrolytic capacitor, the at least one lead may include two leads. One of the two leads may be connected to the anode aluminum foil. The other of the two leads may be connected to the cathode aluminum foil.

In the aluminum electrolytic capacitor, the base and the case may be pressure-bonded.

In the aluminum electrolytic capacitor, the base and the case may be joined by welding.

According to a method for manufacturing an aluminum electrolytic capacitor based on the present invention, the method includes: press-molding a metal plate in which a surface of a base material made of an iron-based metal material is covered with aluminum, to manufacture a base having a through hole; butt-joining an inner lead made of aluminum to one end of an outer lead made of an iron-based metal material, to manufacture a lead; inserting the lead into the through hole of the base, and setting tablets of an insulating glass in a gap between the lead and the base, the insulating glass being made of a low-melting-point glass having a melting point lower than that of aluminum; placing the set base, lead, and tablets in a heating furnace set at a temperature less than or equal to the melting point of aluminum, and sealing the lead and the base with the insulating glass, to manufacture a hermetic terminal; electrically connecting a capacitor element to the hermetic terminal, the capacitor element including an anode aluminum foil having an oxide film on a surface, electrolytic paper impregnated with an electrolytic solution, and a cathode aluminum foil; and inserting the capacitor element into a case made of aluminum which has an opening, and fixing an outer peripheral surface of the base and an inner peripheral surface of the opening of the case.

Preferably, in the method for manufacturing the aluminum electrolytic capacitor, fixing the outer peripheral surface of the base and the inner peripheral surface of the opening of the case includes pressure-bonding the base to the case by press-fitting the base into the opening of the case.

Preferably, in the method for manufacturing the aluminum electrolytic capacitor, fixing the outer peripheral surface of the base and the inner peripheral surface of the opening of the case includes resistance-welding or laser-welding the outer peripheral surface of the base to the inner peripheral surface of the opening of the case without any gap therebetween.

Advantageous Effects of Invention

According to the present invention, a hermetic terminal, an aluminum electrolytic capacitor, and a method for manufacturing an aluminum electrolytic capacitor in which a metal composing a lead and a base does not contaminate an electrolytic solution for the aluminum electrolytic capacitor even when the metal is in contact the electrolytic solution for a long period of time can be provided.

DESCRIPTION OF EMBODIMENTS

In the following, a hermetic terminal, an aluminum electrolytic capacitor using the hermetic terminal, and a method for manufacturing an aluminum electrolytic capacitor in each embodiment based on the present invention will be described with reference to the drawings. It should be noted that, in each embodiment, redundant description on identical or corresponding parts may not be repeated.

First Embodiment

Hereinafter, a first embodiment according to the present invention will be described with reference to FIGS. 1A to 2C.

Figure 1A:
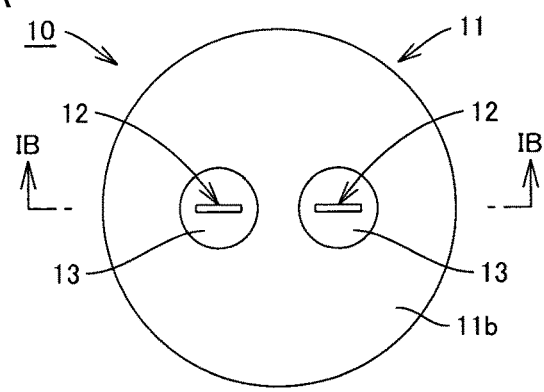
FIG. 1A is a plan view showing a hermetic terminal in a first embodiment based on the present invention.
Figure 1B:
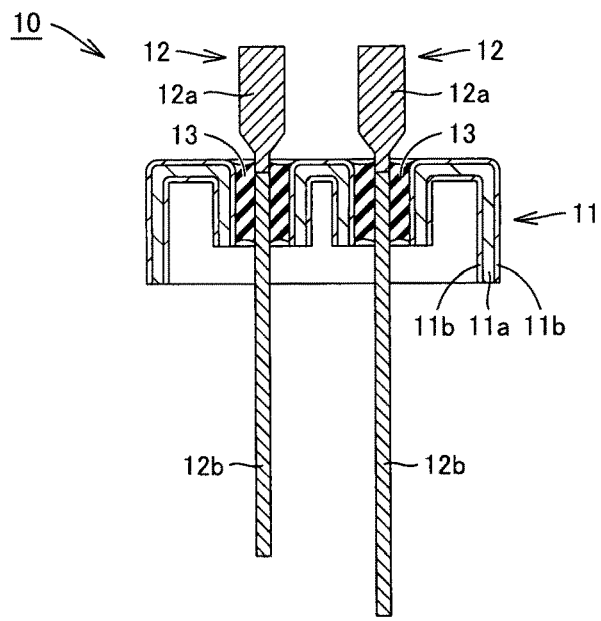
FIG. 1B is a cross sectional view showing the hermetic terminal in the first embodiment based on the present invention, taken along IB-IB and viewed in the direction of arrows in FIG. 1A.
Figure 1C:
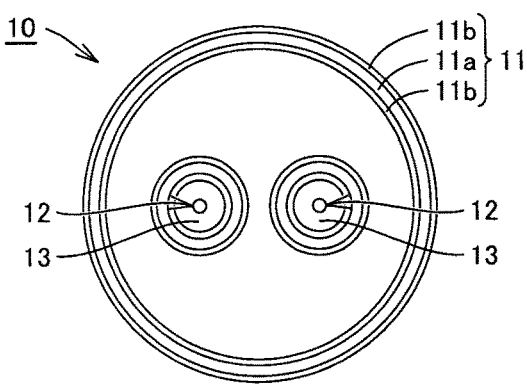
FIG. 1C is a bottom view showing the hermetic terminal in the first embodiment based on the present invention.

As shown in FIGS. 1A to 1C, a hermetic terminal 10 according to the present embodiment includes a base 11, leads 12, and an insulating glass 13. In the description of the present embodiment and subsequent embodiments, an upper side in FIG. 1B is referred to as an inner side, and a lower side in FIG. 1B is referred to as an outer side, based on a state where the hermetic terminal is used for an aluminum electrolytic capacitor.

Base 11 is composed of a clad material in which both surfaces of a base material 11a made of an iron-based metal material are covered with surface materials 11b made of aluminum. Base 11 has a disk-shaped main body portion, and a cylindrical portion which bends at a right angle from an outer periphery of the main body portion and extends toward the outer side. The main body portion is provided with a pair of through holes, with a central portion of the main body portion being sandwiched therebetween. The cylindrical portion which bends at a right angle and extends toward the outer side is provided so as to surround the through holes. Base 11 is manufactured by press-molding the clad material.

Base material 11a is exposed at an end surface of the clad material composing base 11. By bending an outer peripheral portion of the main body portion and outer peripheral portions of the through holes at a right angle toward the outer side, a surface of base 11 facing the inner side is entirely covered with surface material 11b made of aluminum, and thus base material 11a is not exposed at that surface.

Aluminum has corrosion resistance to an electrolytic solution for the aluminum electrolytic capacitor. Although base material 11a made of an iron-based metal material does not have corrosion resistance to the electrolytic solution, base material 11a is not dissolved in the electrolytic solution for the aluminum electrolytic capacitor, because base material 11a of base 11 is not exposed to the inner side of the aluminum electrolytic capacitor.

Lead 12 penetrates each of the two through holes. Lead 12 includes an outer lead 12b made of an iron-based metal material, and an inner lead 12a made of aluminum. One end portion of outer lead 12b is butt-joined to one end portion of inner lead 12a.

A joint between outer lead 12b and inner lead 12a is located within the through hole and closer to the inner side. In other words, in a longitudinal direction of lead 12 penetrating the through hole, outer lead 12b accounts for a large portion, and inner lead 12a accounts for only a small portion closer to the inner side.

Outer lead 12b has a columnar shape. Inner lead 12a has a main body portion in the shape of a rectangular flat plate. A side of inner lead 12a which is joined to outer lead 12b is formed to have a gradually reduced width. A portion of inner lead 12a which is butt-joined to outer lead 12b has a columnar shape having the same diameter as that of outer lead 12b. The shape of inner lead 12a can be changed to various shapes, depending on the shape of a capacitor element to which inner lead 12a is joined.

The iron-based metal material composing base material 11a of base 11 and outer lead 12b of lead 12 refers to a material selected from the group consisting of steel, stainless steel, low-carbon steel, a Kovar alloy, and an iron nickel alloy. Further, an iron-based metal material is excellent in solderability, when compared with aluminum. Good solderability can be ensured by using an iron-based metal material for the outer lead.

As the material composing base material 11a and outer lead 12b, a material which satisfies the condition as described above is preferable. A material other than an iron-based metal material may be used, as long as the material satisfies the above condition.

Lead 12 and base 11 are hermetically sealed with insulating glass 13. Specifically, a gap between an inner peripheral surface of each through hole of base 11 and a portion of lead 12 which faces the inner peripheral surface of the through hole is filled with insulating glass 13.

The joint between inner lead 12a and outer lead 12b of lead 12 is covered with insulating glass 13. Since the joint between inner lead 12a and outer lead 12b is covered with insulating glass 13, outer lead 12b is not exposed to the inner side. This prevents outer lead 12b made of an iron-based metal material from coming into contact with the electrolytic solution. Of lead 12, only inner lead 12a made of aluminum having corrosion resistance to the electrolytic solution comes into contact with the electrolytic solution, which prevents a metal from being dissolved and contaminating the electrolytic solution.

When the thermal expansion coefficient of the iron-based metal material composing base material 11a of base 11 and outer lead 12b of lead 12 is compared with the thermal expansion coefficient of aluminum, the thermal expansion coefficient of the iron-based metal material is closer to the thermal expansion coefficient of glass. Base material 11a composed of the iron-based metal material accounts for a large portion of the volume of base 11. Further, outer lead 12b composed of the iron-based metal material accounts for most of a portion of lead 12 which comes into contact with insulating glass 13. These compositions allow the hermetic terminal to be less likely to be adversely affected by a difference in thermal expansion when the temperature changes.

Insulating glass 13 is a low-melting-point glass such as bismuth-containing glass, for example. Using a low-melting-point glass can prevent melting of aluminum in the step of melting insulating glass 13 within a furnace and hermetically sealing the gap between base 11 and lead 12.

A specific example of the low-melting-point glass is a product named BG-0800 manufactured by Nippon Electric Glass Co., Ltd. This material has a softening point of 510° C., which is lower than the melting point of aluminum. In an experiment conducted by the inventors, this material was highly evaluated in any of evaluation of water-resistance of glass, evaluation of acid-resistance of glass, evaluation of wettability to an aluminum plate, a heat cycle test, and a high-temperature and high-humidity test.

It should be noted that, in the experiment, a clad material composed of aluminum and SUS304 was used as a base, and a lead produced by arc-welding Fe and aluminum was used. In the heat cycle test, heating to 125° C. and cooling to −55° C. were repeated, and leak of He was checked after certain cycles. In the high-temperature and high-humidity test, the hermetic terminal was placed in an environment having an ambient temperature of 85° C. and a humidity of 85%, and leak was checked after a certain time.

Figure 2A:
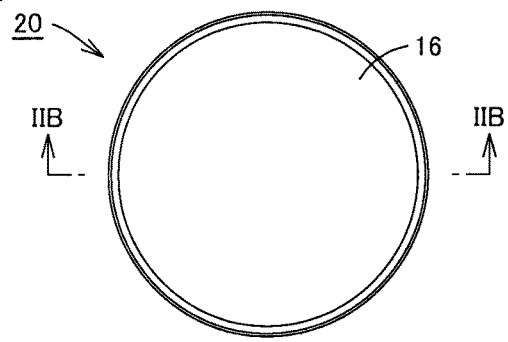
FIG. 2A is a plan view showing an aluminum electrolytic capacitor in the first embodiment based on the present invention.
Figure 2B:
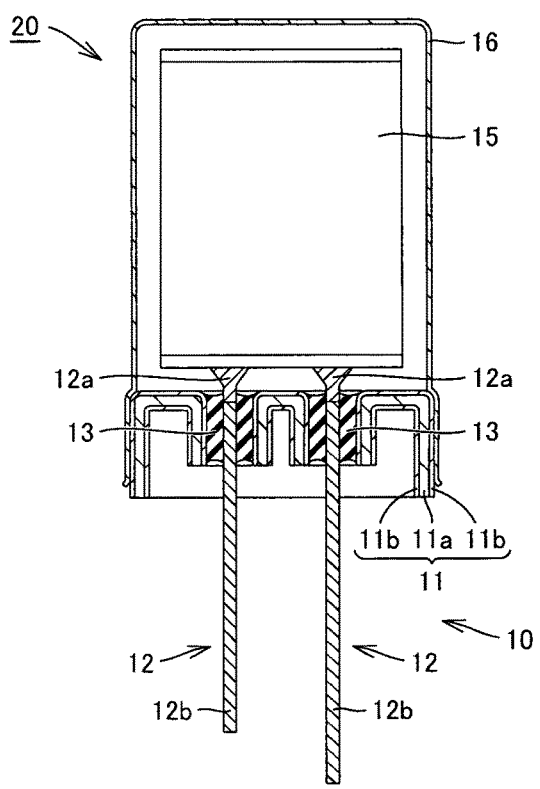
FIG. 2B is a cross sectional view showing the aluminum electrolytic capacitor in the first embodiment based on the present invention, taken along IIB-IIB and viewed in the direction of arrows in FIG. 2A.
Figure 2C:
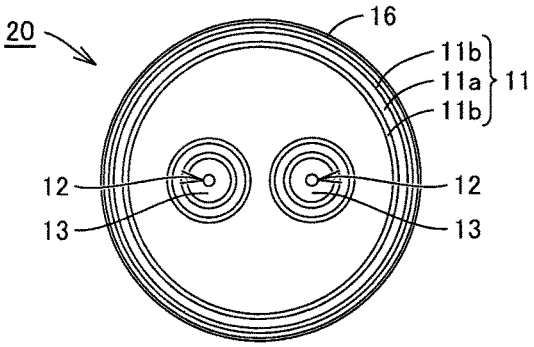
FIG. 2C is a bottom view showing the aluminum electrolytic capacitor in the first embodiment based on the present invention.

Next, an aluminum electrolytic capacitor 20 using hermetic terminal 10 will be described with reference to FIGS. 2A to 2C. As shown in FIG. 2B, aluminum electrolytic capacitor 20 includes hermetic terminal 10, a capacitor element 15, and a case 16.

Capacitor element 15 is produced by cylindrically winding an anode aluminum foil having an oxide film formed on a surface, electrolytic paper impregnated with the electrolytic solution, and a cathode aluminum foil. Inner leads 12a are respectively connected to the anode aluminum foil and the cathode aluminum foil of capacitor element 15.

Case 16 has a cylindrical shape having an internal space and an opening. Case 16 is formed of aluminum. Capacitor element 15 is housed within case 16. Hermetic terminal 10 is hermetically pressure-bonded to the opening of case 16. Hermetic pressure-bonding to case 16 is performed by press-fitting base 11 of hermetic terminal 10 into the opening of case 16.

Since hermetic terminal 10 is hermetically pressure-bonded to case 16, hermeticity between case 16 and hermetic terminal 10 can be ensured. Further, since the gap between base 11 and lead 12 of hermetic terminal 10 is also hermetically sealed with insulating glass 13, high hermeticity is ensured. Thereby, drying-up of the electrolytic solution within case 16 can be prevented, and the aluminum electrolytic capacitor can have a longer life.

Second Embodiment

Hereinafter, a second embodiment according to the present invention will be described with reference to FIGS. 3A to 4C.

Figure 3A:
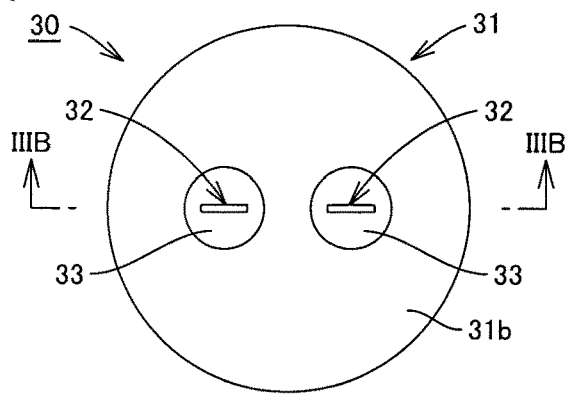
FIG. 3A is a plan view showing a hermetic terminal in a second embodiment based on the present invention.
Figure 3B:
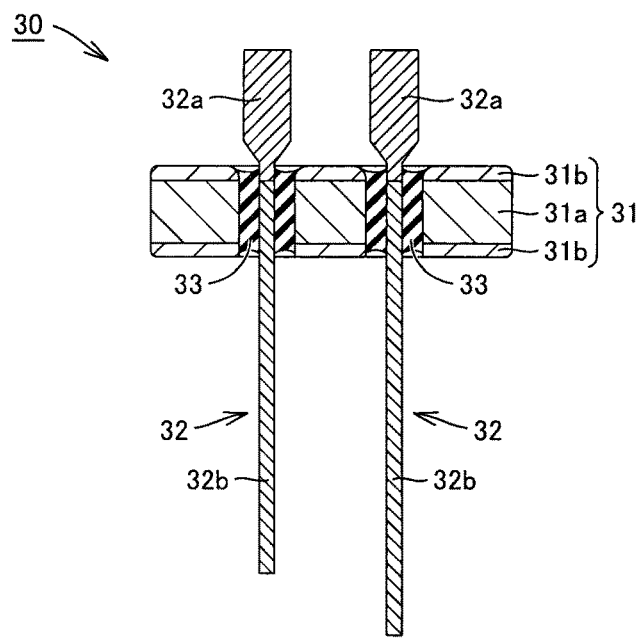
FIG. 3B is a cross sectional view showing the hermetic terminal in the second embodiment based on the present invention, taken along IIIB-IIIB and viewed in the direction of arrows in FIG. 3A.
Figure 3C:
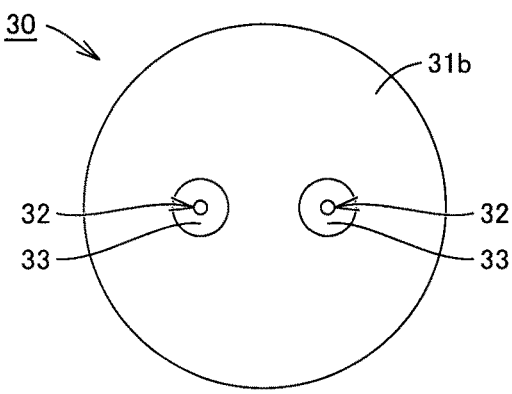
FIG. 3C is a bottom view showing the hermetic terminal in the second embodiment based on the present invention.

As shown in FIGS. 3A to 3C, a hermetic terminal 30 according to the present embodiment includes a base 31, leads 32, and an insulating glass 33.

Base 31 is composed of a clad material in which both surfaces of a base material 31a made of an iron-based metal material are covered with surface materials 31b made of aluminum. Base 31 is formed in a disk shape. Base 31 is provided with a pair of through holes, with a central portion of base 31 being sandwiched therebetween. Although base material 31a is exposed at an end surface of the clad material composing base 31, a surface of base 31 facing the inner side is entirely covered with surface material 31b made of aluminum, and thus base material 31a is not exposed at that surface.

Aluminum has corrosion resistance to an electrolytic solution for an aluminum electrolytic capacitor. Although base material 31a made of an iron-based metal material does not have corrosion resistance to the electrolytic solution, base material 31a is not dissolved in the electrolytic solution for the aluminum electrolytic capacitor, because base material 31a of base 31 is not exposed to the inner side of the aluminum electrolytic capacitor.

Lead 32 penetrates each of the two through holes. Lead 32 includes an outer lead 32b made of an iron-based metal material, and an inner lead 32a made of aluminum. One end portion of outer lead 32b is butt-joined to one end portion of inner lead 32a.

A joint between outer lead 32b and inner lead 32a is located within the through hole and closer to the inner side. In other words, in a longitudinal direction of lead 32 penetrating the through hole, outer lead 32b accounts for a large portion, and inner lead 32a accounts for only a small portion closer to the inner side.

Outer lead 32b has a columnar shape. Inner lead 32a has a main body portion in the shape of a rectangular flat plate. A side of inner lead 32a which is joined to outer lead 32b is formed to have a gradually reduced width. A portion of inner lead 32a which is butt-joined to outer lead 32b has a columnar shape having the same diameter as that of outer lead 32b. The shape of inner lead 32a can be changed to various shapes, depending on the shape of a capacitor element to which inner lead 32a is joined.

Lead 32 and base 31 are hermetically sealed with insulating glass 33. Specifically, a gap between an inner peripheral surface of each through hole of base 31 and a portion of lead 32 which faces the inner peripheral surface of the through hole is filled with insulating glass 33.

The joint between inner lead 32a and outer lead 32b of lead 32 is covered with insulating glass 33. Since the joint between inner lead 32a and outer lead 32b is covered with insulating glass 33, outer lead 32b is not exposed to the inner side. This prevents outer lead 32b from coming into contact with the electrolytic solution. Of lead 32, only inner lead 32a made of aluminum having corrosion resistance to the electrolytic solution comes into contact with the electrolytic solution, which prevents a metal from being dissolved and contaminating the electrolytic solution.

Figure 4A:
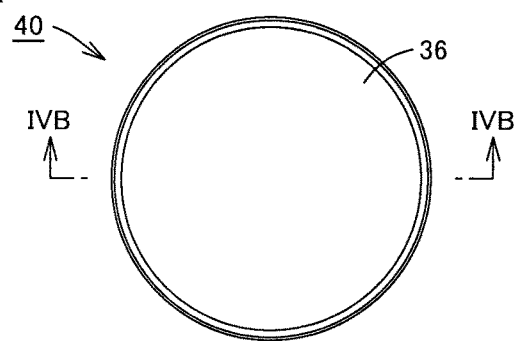
FIG. 4A is a plan view showing an aluminum electrolytic capacitor in the second embodiment based on the present invention.
Figure 4B:
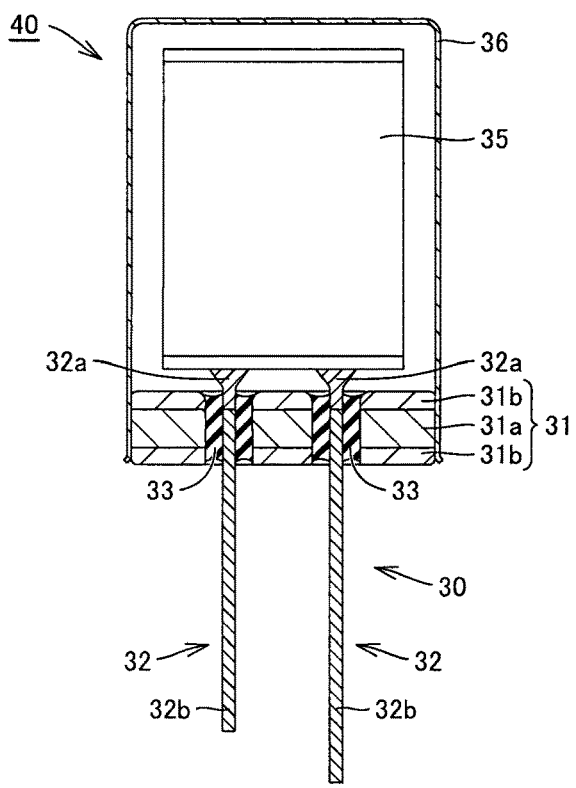
FIG. 4B is a cross sectional view showing the aluminum electrolytic capacitor in the second embodiment based on the present invention, taken along IVB-IVB and viewed in the direction of arrows in FIG. 4A.
Figure 4C:
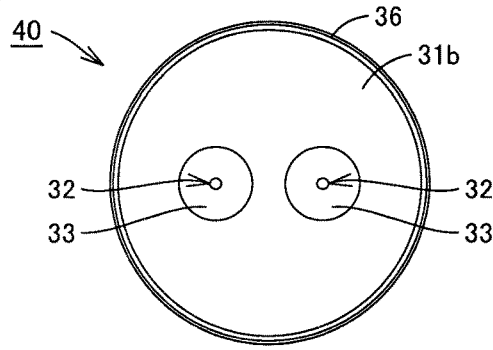
FIG. 4C is a bottom view showing the aluminum electrolytic capacitor in the second embodiment based on the present invention.

Next, an aluminum electrolytic capacitor 40 using hermetic terminal 30 will be described with reference to FIGS. 4A to 4C. As shown in FIG. 4B, aluminum electrolytic capacitor 40 includes hermetic terminal 30, a capacitor element 35, and a case 36.

Capacitor element 35 is produced by cylindrically winding an anode aluminum foil having an oxide film formed on a surface, electrolytic paper impregnated with the electrolytic solution, and a cathode aluminum foil. Inner leads 32a are respectively connected to the anode aluminum foil and the cathode aluminum foil of capacitor element 35.

Case 36 has a cylindrical shape having an internal space and an opening. Case 36 is formed of aluminum. Capacitor element 35 is housed within case 36. Hermetic terminal 30 is hermetically sealed to the opening of case 36. Hermetic sealing to case 36 is performed by welding an outer peripheral surface of base 31 to an inner peripheral surface of an end portion of case 36, along the entire periphery, without any gap therebetween. More specifically, an outer peripheral surface of surface material 31b closer to the inner side of base 31 is welded to the inner peripheral surface of the end portion of case 36. In the welding step, resistance welding or laser welding can be used.

Since hermetic terminal 30 is hermetically sealed to case 36, hermeticity between case 36 and hermetic terminal 30 can be ensured. Further, since the gap between base 31 and lead 32 of hermetic terminal 30 is also hermetically sealed with insulating glass 33, high hermeticity is ensured. Thereby, drying-up of the electrolytic solution within case 36 can be prevented, and the aluminum electrolytic capacitor can have a longer life.

Third Embodiment

Hereinafter, a third embodiment according to the present invention will be described with reference to FIGS. 5A and 5B.

Figure 5A:
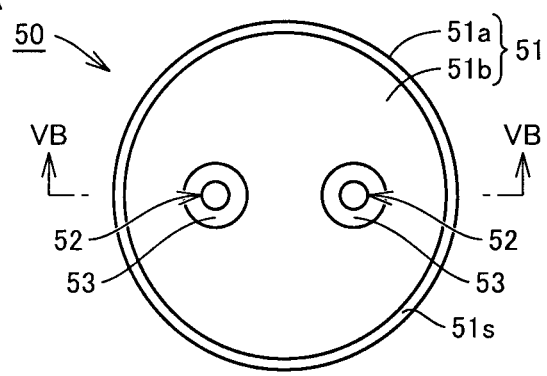
FIG. 5A is a plan view showing a hermetic terminal in a third embodiment based on the present invention.
Figure 5B:
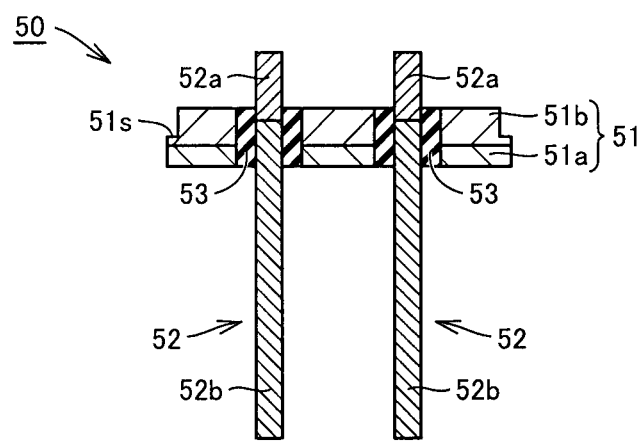
FIG. 5B is a cross sectional view showing the hermetic terminal in the third embodiment based on the present invention, taken along VB-VB and viewed in the direction of arrows in FIG. 5A.

As shown in FIGS. 5A and 5B, a hermetic terminal 50 according to the present embodiment includes a base 51, leads 52, and an insulating glass 53.

Base 51 is composed of a clad material in which one surface of a base material 51a made of an iron-based metal material is covered with a surface material 51b made of aluminum. Base 51 is formed in a disk shape. Base 51 is provided with a pair of through holes. An outer peripheral surface of base 51 is provided with a diameter-expanded portion 51s. An end portion on an opening side of a case of an aluminum electrolytic capacitor abuts on diameter-expanded portion 51s. An interface between base material 51a and surface material 51b is located within the thickness of diameter-expanded portion 51s.

Although base material 51a is exposed at an end surface of the clad material composing base 51, a surface of base 51 facing the inner side which is on an inner peripheral side of diameter-expanded portion 51s is entirely covered with surface material 51b made of aluminum, and thus base material 51a is not exposed at that surface. A surface of diameter-expanded portion 51s closer to the inner side, and a surface of base 51 closer to the inner side than diameter-expanded portion 51s are entirely covered with aluminum.

Aluminum has corrosion resistance to an electrolytic solution for the aluminum electrolytic capacitor. Although base material 51a made of an iron-based metal material does not have corrosion resistance to the electrolytic solution, base 51 is not dissolved in the electrolytic solution for the aluminum electrolytic capacitor, because base material 51a of base 51 is not exposed to the inner side of the aluminum electrolytic capacitor.

Lead 52 penetrates each of the two through holes. Lead 52 includes an outer lead 52b made of an iron-based metal material, and an inner lead 52a made of aluminum. One end portion of outer lead 52b is butt-joined to one end portion of inner lead 52a.

A joint between outer lead 52b and inner lead 52a is located within the through hole and closer to the inner side. In other words, in a longitudinal direction of lead 52 penetrating the through hole, outer lead 52b accounts for a large portion, and inner lead 52a accounts for only a small portion closer to the inner side.

Outer lead 52b and inner lead 52a have a columnar shape. The shape of inner lead 52a can be changed to various shapes, depending on the shape of a capacitor element to which inner lead 52a is joined.

Lead 52 and base 51 are hermetically sealed with insulating glass 53. Specifically, a gap between an inner peripheral surface of each through hole of base 51 and a portion of lead 52 which faces the inner peripheral surface of the through hole is filled with insulating glass 53.

The joint between inner lead 52a and outer lead 52b of lead 52 is covered with insulating glass 53. Since the joint between inner lead 52a and outer lead 52b is covered with insulating glass 53, outer lead 52b is not exposed to the inner side. This prevents outer lead 52b from coming into contact with the electrolytic solution. Of lead 52, only inner lead 52a made of aluminum having corrosion resistance to the electrolytic solution comes into contact with the electrolytic solution, which prevents a metal from being dissolved and contaminating the electrolytic solution.

A case and a capacitor element not shown are attached to hermetic terminal 50 to constitute the aluminum electrolytic capacitor. Hermetic terminal 50 is hermetically sealed to an opening of the case. Hermetic sealing to the case is performed by resistance-welding or laser-welding an outer peripheral surface of base 51 closer to the inner side than diameter-expanded portion 51s to an inner peripheral surface of an end portion of the case, along the entire periphery, without any gap therebetween.

Since hermetic terminal 50 is hermetically sealed to the case, hermeticity between the case and hermetic terminal 50 can be ensured. Further, since the gap between base 51 and lead 52 of hermetic terminal 50 is also hermetically sealed with insulating glass 33, high hermeticity is ensured. Thereby, drying-up of the electrolytic solution within the case can be prevented, and the aluminum electrolytic capacitor can have a longer life.

(Manufacturing Methods)

Methods for manufacturing the hermetic terminals and the aluminum electrolytic capacitors in the first and second embodiments will be described with reference to FIGS. 6A and 6B.

Figure 6A:
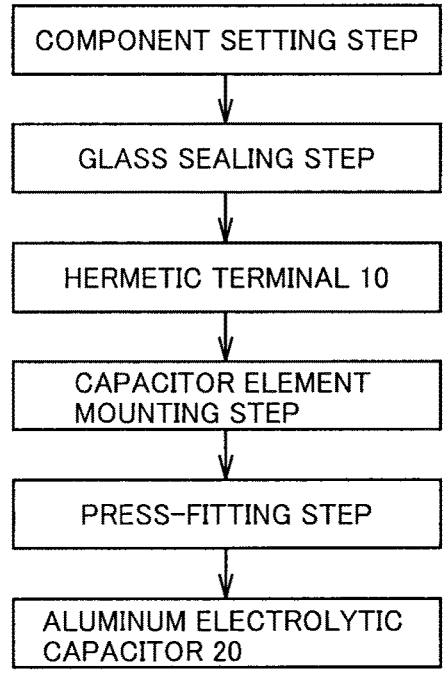
FIG. 6A is a flowchart showing a method for manufacturing an aluminum electrolytic capacitor in an embodiment based on the present invention.

In the method for manufacturing hermetic terminal 10 according to the first embodiment shown in FIG. 6A, first, a metal plate in which the surfaces of base material 11a made of an iron-based metal are covered with surface materials 11b made of aluminum is press-molded to manufacture base 11 having through holes.

Next, inner lead 12a made of aluminum is butt-joined to one end of outer lead 12b made of an iron-based metal to manufacture lead 12.

Next, lead 12 is inserted into each through hole of base 11, and tablets of insulating glass 13 made of a low-melting-point glass having a melting point lower than that of aluminum is set in a gap between lead 12 and base 11.

Next, the set base 11, lead 12, and tablets of insulating glass 13 are placed in a heating furnace set at a temperature less than or equal to the melting point of aluminum, to seal lead 12 and base 11 with insulating glass 13. Thereby, a hermetic terminal is completed.

In the method for manufacturing aluminum electrolytic capacitor 20 using hermetic terminal 10 shown in FIG. 6A, capacitor element 15 including an anode aluminum foil having an oxide film on a surface, electrolytic paper impregnated with an electrolytic solution, and a cathode aluminum foil is electrically connected to hermetic terminal 10.

Next, capacitor element 15 is inserted into case 16 made of aluminum which has an opening, and an outer peripheral surface of base 11 is fixed to an inner peripheral surface of the opening of case 16. In this fixing, base 11 is press-fitted into case 16 and thereby pressure-bonded to case 16.

Figure 6B:
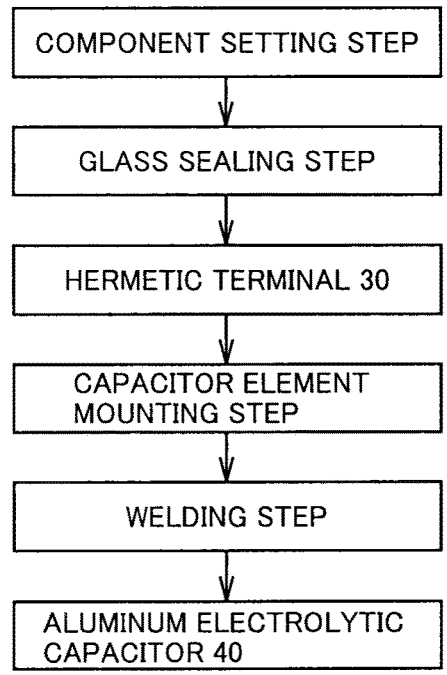
FIG. 6B is a flowchart showing a method for manufacturing an aluminum electrolytic capacitor in an embodiment based on the present invention.

In the method for manufacturing hermetic terminal 30 according to the second embodiment shown in FIG. 6B, first, a metal plate in which the surfaces of base material 31a made of an iron-based metal are covered with surface materials 31b made of aluminum is press-molded to manufacture a base having through holes.

Next, inner lead 32a made of aluminum is butt-joined to one end of outer lead 32b made of an iron-based metal material to manufacture lead 32.

Next, lead 32 is inserted into each through hole of base 31, and tablets of insulating glass 33 made of a low-melting-point glass having a melting point lower than that of aluminum is set in a gap between lead 32 and base 31.

Next, the set base 31, lead 32, and tablets of insulating glass 33 are placed in a heating furnace set at a temperature less than or equal to the melting point of aluminum, to seal lead 32 and base 31 with insulating glass 33. Thereby, a hermetic terminal is manufactured.

In the method for manufacturing aluminum electrolytic capacitor 40 using hermetic terminal 30 shown in FIG. 6B, capacitor element 35 including an anode aluminum foil having an oxide film on a surface, electrolytic paper impregnated with an electrolytic solution, and a cathode aluminum foil is electrically connected to hermetic terminal 30.

Next, capacitor element 35 is inserted into case 36 made of aluminum which has an opening, and an outer peripheral surface of base 31 is fixed to an inner peripheral surface of the opening of case 36. In this fixing, the outer peripheral surface of base 31 is resistance-welded or laser-welded to the inner peripheral surface of the opening of case 36 without any gap therebetween.

Fourth Embodiment

Hereinafter, a fourth embodiment according to the present invention will be described with reference to FIGS. 7A and 7B.

Figure 7A:
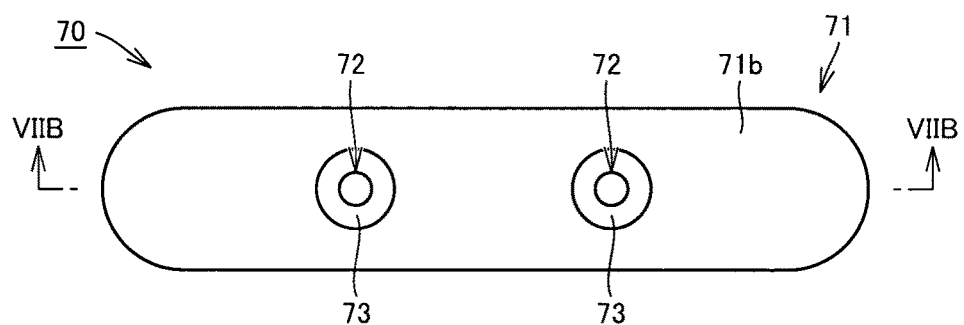
FIG. 7A is a plan view showing a hermetic terminal in a fourth embodiment based on the present invention.
Figure 7B:
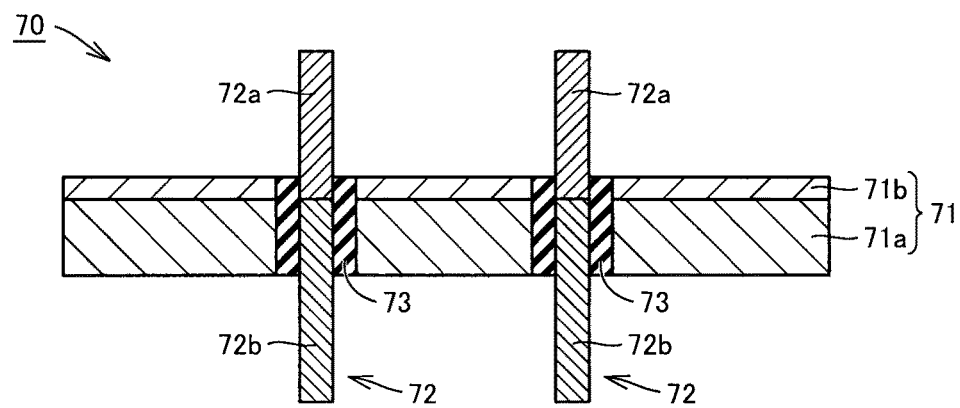
FIG. 7B is a cross sectional view showing the hermetic terminal in the fourth embodiment based on the present invention, taken along VIIB-VIIB and viewed in the direction of arrows in FIG. 7A.

As shown in FIGS. 7A and 7B, a hermetic terminal 70 according to the present embodiment includes a base 71, leads 72, and an insulating glass 73.

Base 71 is composed of a clad material in which one surface of a base material 71a made of an iron-based metal material is covered with a surface material 71b made of aluminum. Base 71 is formed to have the shape of an ellipse having a pair of parallel side surfaces and arcs connecting the side surfaces. Base 71 is provided with a pair of through holes.

Although base material 71a is exposed at an end surface of the clad material composing base 71, a surface of base 71 facing the inner side is entirely covered with surface material 71b made of aluminum, and thus base material 71a is not exposed at that surface.

Aluminum has corrosion resistance to an electrolytic solution for an aluminum electrolytic capacitor. Since base material 71a of base 71 is not exposed to the inner side of the aluminum electrolytic capacitor, base 71 is not dissolved in the electrolytic solution for the aluminum electrolytic capacitor.

Lead 72 penetrates each of the two through holes. Lead 72 includes an outer lead 72b made of an iron-based metal material, and an inner lead 72a made of aluminum. One end portion of outer lead 72b is butt-joined to one end portion of inner lead 72a.

A joint between outer lead 72b and inner lead 72a is located within the through hole and closer to the inner side. In other words, in a longitudinal direction of lead 72 penetrating the through hole, outer lead 72b accounts for a large portion, and inner lead 72a accounts for only a small portion closer to the inner side.

Outer lead 72b and inner lead 72a have a columnar shape. The shape of inner lead 72a can be changed to various shapes, depending on the shape of a capacitor element to which inner lead 72a is joined.

Lead 72 and base 71 are hermetically sealed with insulating glass 73. Specifically, a gap between an inner peripheral surface of each through hole of base 71 and a portion of lead 72 which faces the inner peripheral surface of the through hole is filled with insulating glass 73.

The joint between inner lead 72a and outer lead 72b of lead 72 is covered with insulating glass 73. Since the joint between inner lead 72a and outer lead 72b is covered with insulating glass 73, outer lead 72b is not exposed to the inner side. This prevents outer lead 72b from coming into contact with the electrolytic solution. Of lead 72, only inner lead 72a made of aluminum having corrosion resistance to the electrolytic solution comes into contact with the electrolytic solution, which prevents a metal from being dissolved and contaminating the electrolytic solution.

A case and a capacitor element not shown are attached to hermetic terminal 70 to constitute the aluminum electrolytic capacitor. The case has an elongated planar shape corresponding to the planar shape of base 71 shown in FIG. 7A. Hermetic terminal 70 is hermetically sealed to an opening of the case. Hermetic sealing to the case is performed by resistance-welding an outer peripheral surface of base 71 to an inner peripheral surface of an end portion of the case, along the entire periphery, without any gap therebetween. More specifically, an outer peripheral surface of surface material 71b of base 71 is welded to the inner peripheral surface of the end portion of the case. In the welding step, resistance welding or laser welding can be used.

Since hermetic terminal 70 is hermetically sealed to the case, hermeticity between the case and hermetic terminal 70 can be ensured. In particular, although the case has a non-cylindrical shape in the present embodiment, high hermeticity can be ensured even in an aluminum electrolytic capacitor having such a case. Further, since the gap between base 71 and lead 72 of hermetic terminal 70 is also hermetically sealed with insulating glass 73, high hermeticity is ensured. Thereby, drying-up of the electrolytic solution within the case can be prevented, and the aluminum electrolytic capacitor can have a longer life.

Fifth Embodiment

Figure 8:
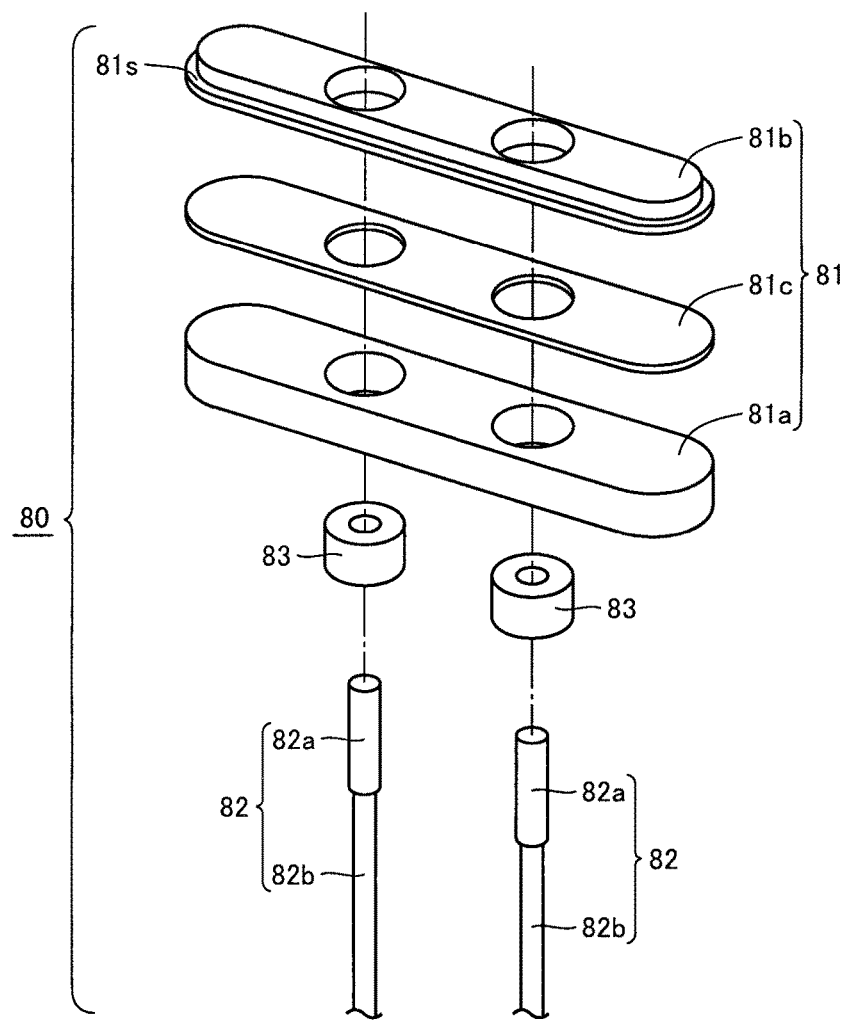
FIG. 8 is an exploded perspective view showing a hermetic terminal in a fifth embodiment based on the present invention.

Hereinafter, a fifth embodiment according to the present invention will be described with reference to FIG. 8. As shown in FIG. 8, a hermetic terminal 80 according to the present embodiment includes a base 81, leads 82, and an insulating glass 83.

Base 81 is composed of a clad material in which one surface of a base material 81a made of an iron-based metal material is covered with a surface material 81b made of aluminum, and a thin plate of nickel is inserted as an intermediate layer 81c between base material 81a and surface material 81b. Base 81 is formed to substantially have the shape of an ellipse having a pair of parallel side surfaces and arcs connecting the side surfaces. Here, SUS304 is used as the iron-based metal material. Base 81 is provided with a pair of through holes.

Surface material 81b has an expanded portion 81s which is outwardly expanded. Although base material 81a and intermediate layer 81c are exposed at an end surface of the clad material composing base 81, a surface of base 81 facing the inner side which is on an inner peripheral side of expanded portion 81s is entirely covered with surface material 81b made of aluminum, and thus base material 81a and intermediate layer 81c are not exposed at that surface.

Aluminum has corrosion resistance to an electrolytic solution for an aluminum electrolytic capacitor. Since base material 81a and intermediate layer 81c of base 81 are not exposed to the inner side of the aluminum electrolytic capacitor, base material 81a is not dissolved in the electrolytic solution for the aluminum electrolytic capacitor.

Lead 82 penetrates each of the two through holes. Lead 82 includes an outer lead 82b made of an iron-based metal material, and an inner lead 82a made of aluminum. One end portion of outer lead 82b is butt-joined to one end portion of inner lead 82a.

A joint between outer lead 82b and inner lead 82a is located within the through hole and closer to the inner side. In other words, in a longitudinal direction of lead 82 penetrating the through hole, outer lead 82b accounts for a large portion, and inner lead 82a accounts for only a small portion closer to the inner side.

Outer lead 82b and inner lead 82a have a columnar shape. Inner lead 82a has a diameter larger than that of outer lead 82b. The shape of inner lead 82a can be changed to various shapes, depending on the shape of a capacitor element to which inner lead 82a is joined.

Lead 82 and base 81 are hermetically sealed with insulating glass 83. Specifically, a gap between an inner peripheral surface of each through hole of base 81 and a portion of lead 82 which faces the inner peripheral surface of the through hole is filled with insulating glass 83.

The joint between inner lead 82a and outer lead 82b of lead 82 is covered with insulating glass 83. Since the joint between inner lead 82a and outer lead 82b is covered with insulating glass 83, outer lead 82b is not exposed to the inner side. This prevents outer lead 82b from coming into contact with the electrolytic solution. Of lead 82, only inner lead 82a made of aluminum having corrosion resistance to the electrolytic solution comes into contact with the electrolytic solution, which prevents a metal from being dissolved and contaminating the electrolytic solution.

Next, a case and a capacitor element not shown are attached to hermetic terminal 80 to constitute the aluminum electrolytic capacitor. The case has an elongated planar shape corresponding to the planar shape of base 81 shown in FIG. 8. Hermetic terminal 80 is hermetically sealed to an opening of the case. Hermetic sealing to the case is performed by resistance-welding or laser-welding an outer peripheral surface of base 81 closer to the inner side than expanded portion 81s to an inner peripheral surface of an end portion of the case, along the entire periphery, without any gap therebetween.

Since hermetic terminal 80 is hermetically sealed to the case, hermeticity between the case and hermetic terminal 80 can be ensured. In particular, although the case has a non-cylindrical shape in the present embodiment, high hermeticity can be ensured even in an aluminum electrolytic capacitor having such a case. Further, since the gap between base 81 and lead 82 of hermetic terminal 80 is also hermetically sealed with insulating glass 83, high hermeticity is ensured. Thereby, drying-up of the electrolytic solution within the case can be prevented, and the aluminum electrolytic capacitor can have a longer life.

Sixth Embodiment

Hereinafter, a sixth embodiment according to the present invention will be described with reference to FIGS. 9A and 9B.

Figure 9A:
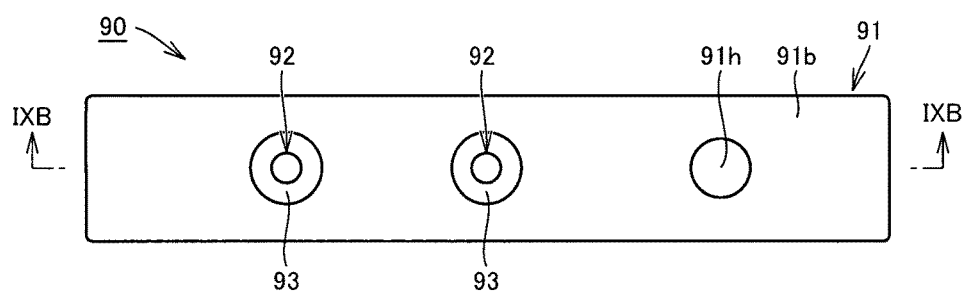
FIG. 9A is a plan view showing a hermetic terminal in a sixth embodiment based on the present invention.
Figure 9B:
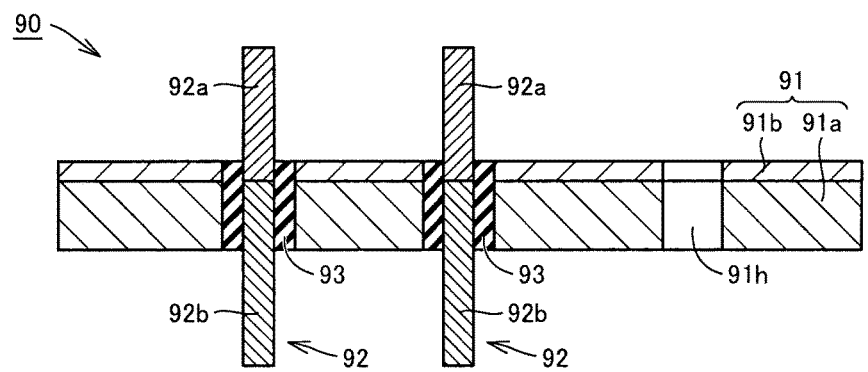
FIG. 9B is a cross sectional view showing the hermetic terminal in the sixth embodiment based on the present invention, taken along IXB-IXB and viewed in the direction of arrows in FIG. 9A.

As shown in FIGS. 9A and 9B, a hermetic terminal 90 according to the present embodiment includes a base 91, leads 92, and an insulating glass 93.

Base 91 is composed of a clad material in which one surface of a base material 91a made of an iron-based metal material is covered with a surface material 91b made of aluminum. Base 91 is formed in a rectangular shape in plan view. Base 91 is provided with equally spaced three through holes.

Although base material 91a is exposed at an end surface of the clad material composing base 91, a surface of base 91 facing the inner side is entirely covered with surface material 91b made of aluminum, and thus base material 91a is not exposed at that surface.

Aluminum has corrosion resistance to an electrolytic solution for an aluminum electrolytic capacitor. Since base material 91a of base 91 is not exposed to the inner side of the aluminum electrolytic capacitor, base material 91a is not dissolved in the electrolytic solution for the aluminum electrolytic capacitor.

Lead 92 penetrates each of two adjacent through holes of the three through holes. Lead 92 includes an outer lead 92b made of an iron-based metal material, and an inner lead 92a made of aluminum. One end portion of outer lead 92b is butt-joined to one end portion of inner lead 92a.

A joint between outer lead 92b and inner lead 92a is located within the through hole and closer to the inner side. In other words, in a longitudinal direction of lead 92 penetrating the through hole, outer lead 92b accounts for a large portion, and inner lead 92a accounts for only a small portion closer to the inner side.

Outer lead 92b and inner lead 92a have a columnar shape. The shape of inner lead 92a can be changed to various shapes, depending on the shape of a capacitor element to which inner lead 92a is joined.

Lead 92 and base 91 are hermetically sealed with insulating glass 93. Specifically, a gap between an inner peripheral surface of each through hole of base 91 and a portion of lead 92 which faces the inner peripheral surface of the through hole is filled with insulating glass 93.

The joint between inner lead 92a and outer lead 92b of lead 92 is covered with insulating glass 93. Since the joint between inner lead 92a and outer lead 92b is covered with insulating glass 93, outer lead 92b is not exposed to the inner side. This prevents outer lead 92b from coming into contact with the electrolytic solution. Of lead 92, only inner lead 92a made of aluminum having corrosion resistance to the electrolytic solution comes into contact with the electrolytic solution, which prevents a metal from being dissolved and contaminating the electrolytic solution.

A third through hole 91h is provided to let off steam of a solvent of the electrolytic solution when an internal pressure becomes excessive. This through hole 91h is equipped with a valve, a cover body opened on the outer side, a stopper, or the like.

A case and a capacitor element not shown are attached to hermetic terminal 90 to constitute the aluminum electrolytic capacitor. The case has a rectangular planar shape corresponding to the planar shape of base 91 shown in FIG. 9A. Hermetic terminal 90 is hermetically sealed to an opening of the case. Hermetic sealing to the case is performed by welding an outer peripheral surface of base 91 to an inner peripheral surface of an end portion of the case, along the entire periphery, without any gap therebetween. More specifically, an outer peripheral surface of surface material 91b of base 91 is welded to the inner peripheral surface of the end portion of the case. In the welding step, resistance welding or laser welding can be used.

Since hermetic terminal 90 is hermetically sealed to the case, hermeticity between the case and hermetic terminal 90 can be ensured. In particular, although the case has a non-cylindrical shape in the present embodiment, high hermeticity can be ensured even in an aluminum electrolytic capacitor having such a case. Further, since the gap between base 91 and lead 92 of hermetic terminal 90 is also hermetically sealed with insulating glass 93, high hermeticity is ensured. Thereby, drying-up of the electrolytic solution within the case can be prevented, and the aluminum electrolytic capacitor can have a longer life.

Seventh Embodiment

Hereinafter, a seventh embodiment according to the present invention will be described with reference to FIGS. 10A and 10B.

Figure 10A:
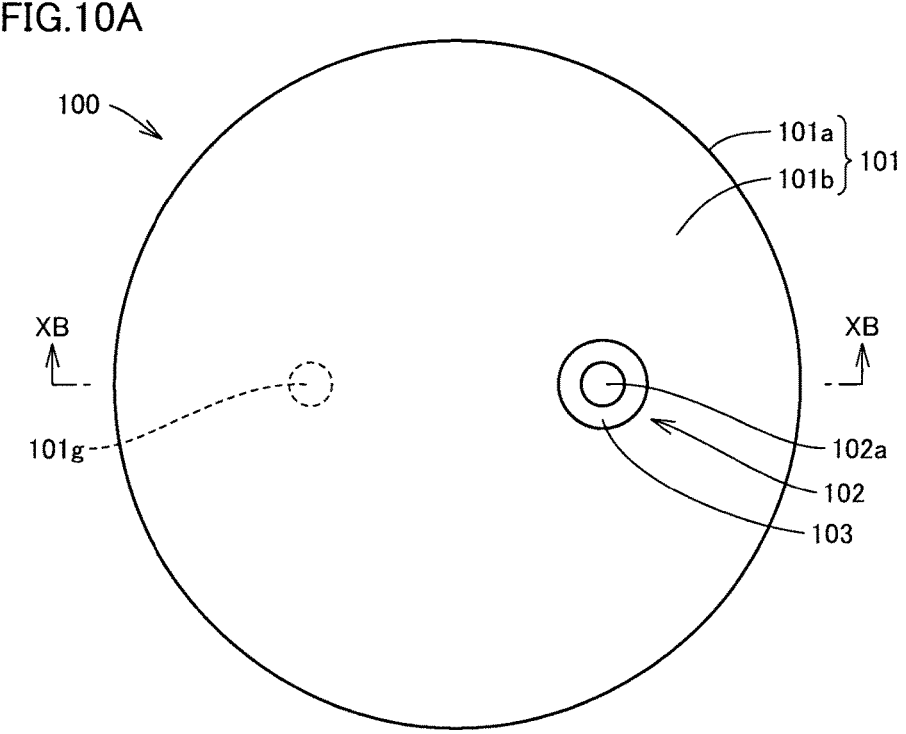
FIG. 10A is a plan view showing a hermetic terminal in a seventh embodiment based on the present invention.
Figure 10B:
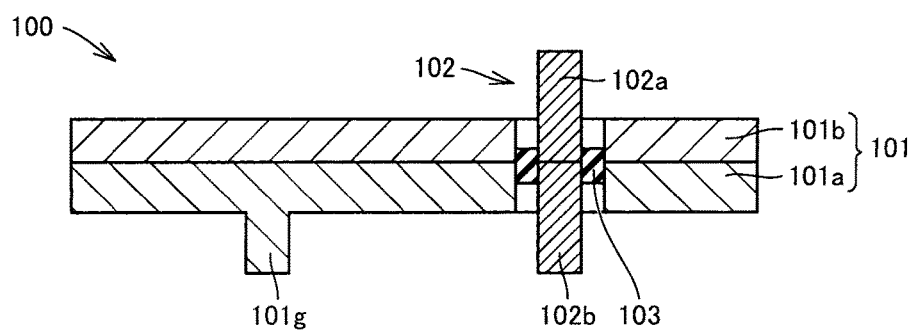
FIG. 10B is a cross sectional view showing the hermetic terminal in the seventh embodiment based on the present invention, taken along XB-XB and viewed in the direction of arrows in FIG. 10A.

As shown in FIGS. 10A and 10B, a hermetic terminal 100 according to the present embodiment includes a base 101, a lead 102, and an insulating glass 103.

Base 101 is composed of a clad material in which one surface of a base material 101a made of an iron-based metal material is covered with a surface material 101b made of aluminum. Base 101 is formed in a disk shape. Base 101 is provided with one through hole.

Although base material 101a is exposed at an end surface of the clad material composing base 101, a surface of base 101 facing the inner side is entirely covered with surface material 101b made of aluminum, and thus base material 101a is not exposed at that surface.

Aluminum has corrosion resistance to an electrolytic solution for an aluminum electrolytic capacitor. Since base material 101a of base 101 is not exposed to the inner side of the aluminum electrolytic capacitor, base material 101a is not dissolved in the electrolytic solution for the aluminum electrolytic capacitor.

A surface of base 101 on the outer side is provided with a protruding portion 101g. Protruding portion 101g is composed to have a columnar shape. A ground side of a capacitor element is electrically connected to base 101 directly or via a case.

Lead 102 penetrates the through hole of base 101. Lead 102 includes an outer lead 102b made of an iron-based metal material, and an inner lead 102a made of aluminum. One end portion of outer lead 102b is butt-joined to one end portion of inner lead 102a.

Outer lead 102b and inner lead 102a have a columnar shape. The capacitor element is electrically connected to the inner side of inner lead 102a. The shape of the inner lead can be changed to various shapes, depending on the shape of the capacitor element to which the inner lead is joined.

Lead 102 and base 101 are hermetically sealed with insulating glass 103. Specifically, a gap between an inner peripheral surface of the through hole of base 101 and a portion of lead 102 which faces the inner peripheral surface of the through hole is partially filled with insulating glass 103. As shown in FIG. 10B, a portion of the through hole in a longitudinal direction is filled with insulating glass 103. Insulating glass 103 may extend along the entire length of the through hole in the longitudinal direction.

A joint between inner lead 102a and outer lead 102b of lead 102 is covered with insulating glass 103. Since the joint between inner lead 102a and outer lead 102b is covered with insulating glass 103, outer lead 102b is not exposed to the inner side. This prevents outer lead 102b from coming into contact with the electrolytic solution. Of lead 102, only inner lead 102a made of aluminum having corrosion resistance to the electrolytic solution comes into contact with the electrolytic solution, which prevents a metal from being dissolved and contaminating the electrolytic solution.

A case and a capacitor element not shown are attached to hermetic terminal 100 to constitute the aluminum electrolytic capacitor. Hermetic terminal 100 is hermetically sealed to an opening of the case. Hermetic sealing to the case is performed by welding an outer peripheral surface of base 101 to an inner peripheral surface of an end portion of the case, along the entire periphery, without any gap therebetween. More specifically, an outer peripheral surface of surface material 101b of base 101 is welded to the inner peripheral surface of the end portion of the case. In the welding step, resistance welding or laser welding can be used.

Since hermetic terminal 100 is hermetically sealed to the case, hermeticity between the case and hermetic terminal 100 can be ensured. Further, since the gap between base 101 and lead 102 of hermetic terminal 100 is also hermetically sealed with insulating glass 103, high hermeticity is ensured. Thereby, drying-up of the electrolytic solution within the case can be prevented, and the aluminum electrolytic capacitor can have a longer life.

It should be understood that the embodiments disclosed herein are illustrative and non-restrictive in every respect. The scope of the present invention is defined by the scope of the claims, rather than the description above, and is intended to include any modifications within the scope and meaning equivalent to the scope of the claims.

INDUSTRIAL APPLICABILITY

A hermetic terminal, an aluminum electrolytic capacitor, and a method for manufacturing an aluminum electrolytic capacitor can be provided.

REFERENCE SIGNS LIST 10, 30, 50, 70, 80, 90, 100: hermetic terminal; 11, 31, 51, 71, 81, 91, 101: base; 11a, 31a, 51a, 71a, 81a, 91a, 101a: base material; 11b, 31b, 51b, 71b, 81b, 91b, 101b: surface material; 12, 32, 52, 72, 82, 92, 102: lead; 12a, 32a, 52a, 72a, 82a, 92a, 102a: inner lead; 12b, 32b, 52b, 72b, 82b, 92b, 102b: outer lead; 13, 33, 53, 73, 83, 93, 103: insulating glass; 15, 35: capacitor element; 16, 36: case; 20, 40: aluminum electrolytic capacitor; 51s: diameter expanded portion; 81c: intermediate layer; 81s: expanded portion; 91h: through hole; 101g: protruding portion.

The invention claimed is:

1. A hermetic terminal to be hermetically fixed to an aluminum electrolytic capacitor, comprising:
   a base which has a through hole, is to be attached to a case of the aluminum electrolytic capacitor, and comprises a composite material having electrical conductivity;
   a first lead which is inserted into the through hole of the base, and comprises a composite material having electrical conductivity; and
   an insulating glass which hermetically seals a gap between the base and the first lead;
   wherein:
   surfaces of portions of the base and the first lead which are to come into contact with an electrolytic solution within the case are composed of a metal material having corrosion resistance to the electrolytic solution,
   the base has a base material comprising an iron-based metal material, and a surface material comprising aluminum which covers at least one surface of the base material,
   the first lead includes an outer lead and an inner lead that is joined to the outer lead at a joint that is positioned closer to an inner side and farther from and outer side within the insulating glass,
   the outer lead comprises an iron-based metal material, and the inner lead comprises aluminum.

2. The hermetic terminal according to claim 1, wherein the inner lead is butt-joined to one end of the outer lead.

3. The hermetic terminal according to claim 1, wherein the insulating glass comprises a low-melting-point glass having a melting point lower than that of aluminum.

4. An aluminum electrolytic capacitor, comprising:
   the hermetic terminal according to claim 1;
   an anode aluminum foil having an oxide film on a surface;
   electrolytic paper impregnated with an electrolytic solution;
   a cathode aluminum foil; and
   a case comprising aluminum in which the anode aluminum foil, the electrolytic paper, and the cathode aluminum foil are housed, and to which the hermetic terminal is hermetically sealed;
   wherein:
   one of the anode aluminum foil and the cathode aluminum foil is electrically connected to the inner lead.

5. The aluminum electrolytic capacitor according to claim 4, wherein the other of the anode aluminum foil and the cathode aluminum foil is electrically connected to the base.

6. The aluminum electrolytic capacitor according to claim 4, wherein:
   the hermetic terminal further comprises a second lead, and
   one of the first and second leads is connected to the anode aluminum foil, and the other of the first and second leads is connected to the cathode aluminum foil.

7. The aluminum electrolytic capacitor according to claim 4, wherein the base and the case are pressure-bonded.

8. The aluminum electrolytic capacitor according to claim 4, wherein the base and the case are joined by welding.

9. A method for manufacturing an aluminum electrolytic capacitor, comprising:
   press-molding a metal plate in which a surface of a base material comprising an iron-based metal material is covered with aluminum, to manufacture a base having a through hole;
   joining an inner lead comprising aluminum to an outer lead comprising an iron-based metal material, to manufacture a lead;
   inserting the lead into the through hole of the base, and setting tablets of an insulating glass in a gap between the lead and the base, the insulating glass comprising a low-melting-point glass having a melting point lower than that of aluminum;
   placing the base, the lead, and the tablets in a heating furnace set at a temperature less than or equal to the melting point of aluminum, and sealing the lead and the base with the insulating glass, to manufacture a hermetic terminal;
   electrically connecting a capacitor element to the hermetic terminal, the capacitor element including an anode aluminum foil having an oxide film on a surface, electrolytic paper impregnated with an electrolytic solution, and a cathode aluminum foil; and
   inserting the capacitor element into a case made of aluminum which has an opening, and fixing an outer peripheral surface of the base and an inner peripheral surface of the opening of the case.

10. The method for manufacturing the aluminum electrolytic capacitor according to claim 9, wherein the fixing of the outer peripheral surface of the base and the inner peripheral surface of the opening of the case comprises pressure-bonding the base to the case by press-fitting the base into the opening of the case.

11. The method for manufacturing the aluminum electrolytic capacitor according to claim 9, wherein the fixing of the outer peripheral surface of the base and the inner peripheral surface of the opening of the case comprises resistance-welding or laser-welding the outer peripheral surface of the base to the inner peripheral surface of the opening of the case without any gap therebetween.

12. The method for manufacturing the aluminum electrolytic capacitor according to claim 9, wherein the joining of the inner lead to the outer lead comprises butt-joining the inner lead to one end of the outer lead.

13. A hermetic terminal to be hermetically fixed to an aluminum electrolytic capacitor, comprising:
   a base which has a through hole, is to be attached to a case of the aluminum electrolytic capacitor, and comprises a composite material having electrical conductivity;
   a lead which is inserted into the through hole of the base, and comprises a composite material having electrical conductivity; and
   an insulating glass which forms a glass seal that hermetically seals a gap between the base and the lead in the through hole of the base;
   wherein:
   surfaces of portions of the base and the lead which are to come into contact with an electrolytic solution within the case are composed of a metal material having corrosion resistance to the electrolytic solution,
   the base has a base material comprising an iron-based metal material, and a surface material comprising aluminum which covers at least one surface of the base material, and
   the lead includes an outer lead joined to an inner lead at a joint that is positioned closer to an inner side and farther from an outer side within the glass seal.

14. A hermetic terminal to be hermetically fixed to an aluminum electrolytic capacitor, comprising:
   a base which has a through hole, is to be attached to an opening of a case of the aluminum electrolytic capacitor, and comprises a composite material having electrical conductivity;

a lead which is inserted into the through hole of the base, and comprises a composite material having electrical conductivity; and an insulating glass which hermetically seals a gap between the base and the lead;

wherein:

surfaces of portions of the base and the lead which are to come into contact with an electrolytic solution within the case are composed of a metal material having corrosion resistance to the electrolytic solution, the base has a base material comprising an iron-based metal material, and a surface material comprising aluminum which covers at least one surface of the base material, and the base has an outer periphery including a first portion having a relatively smaller diameter and a second portion having a relatively larger diameter with a stepped shoulder between the first and second portions, the stepped shoulder is located in the surface material, an interface between the surface material and the base material is located in the second portion, and the stepped shoulder is to abut on an outer end of the case around a perimeter of the opening when the first portion of the base is fitted into the opening to be attached thereto.

* * * * *

UNITED STATES PATENT AND TRADEMARK OFFICE
CERTIFICATE OF CORRECTION

PATENT NO. : 10,249,443 B2
APPLICATION NO. : 15/578444
DATED : April 2, 2019
INVENTOR(S) : Hiroki Honda et al.

It is certified that error appears in the above-identified patent and that said Letters Patent is hereby corrected as shown below:

On the Title Page

<u>Continued on Page 2,</u>
Item [57], Abstract,
Delete and replace the Abstract to read as follows:
--A hermetic terminal to be hermetically fixed to an aluminum electrolytic capacitor includes: a base which has a through hole, is to be attached to a case of the aluminum electrolytic capacitor, and is made of a composite material having electrical conductivity; at least one lead which is inserted into the through hole of the base, and is made of a composite material having electrical conductivity; and an insulating glass which hermetically seals a gap between the base and the lead. Surfaces of portions of the base and the lead which come into contact with an electrolytic solution within the case are composed of a metal material having corrosion resistance to the electrolytic solution.--.

In the Claims

<u>Column 17,</u>
Line 23, after "farther from", replace "and" with --an--.

Signed and Sealed this
Twentieth Day of August, 2019

Andrei Iancu
*Director of the United States Patent and Trademark Office*